United States Patent Office 2,713,040
Patented July 12, 1955

2,713,040

MANUFACTURE OF ARTICLES OF RUBBER-LIKE MATERIALS

Philip D. Brass, Mahwah, and Charles F. Eckert, Westwood, N. J., assignors to United States Rubber Company, New York, N. Y., a corporation of New Jersey No Drawing. Application August 9, 1952,
Serial No. 303,604

2 Claims. (Cl. 260—29.7)

This invention relates to the manufacture of articles of rubber-like materials, and more particularly to improving the tensile strength of articles deposited directly from butadiene-styrene copolymer synthetic rubber latices.

It is known to increase the tensile strength of synthetic rubber vulcanizates by decreasing the temperature of polymerization of the emulsion of the synthetic rubberforming monomers, as in the manufacture of so-called "Cold GR–S" latex, where about 70 to 80 parts of butadiene-1,3 and correspondingly about 30 to 20 parts of styrene are emulsion polymerized at temperatures in the range of about 40° F. to 55° F. The conversion of monomers to polymer is over 50% (and up to 100%). However, where it is desired to manufacture articles by direct deposition of the synthetic rubber from the latex, as in the production of dipped goods, such as dipped gloves and footwear, as in the coating of articles such as coated fabric and electrical conductors, and as in latex foam sponge manufacture where the compounded latex is formed into a foam, shaped, gelled and dried, the strength of the cured articles is still far less than the strength of similar articles made directly from natural Hevea rubber latex and must be further improved. The strength of articles directly deposited from latices may be measured by the tensile strength of cured films laid down from the latices.

We have found that the addition of polyvinyl chloride latex to "cold GR–S" latex will increase by as much as 100% to 200% the tensile strength of cured synthetic rubber films directly deposited therefrom, whereas, on the other hand, addition of polyvinyl chloride latex to natural Hevea rubber latex and to so-called "Hot" GR–S latex (i. e. butadiene-styrene latices emulsion polymerized at about 120° F.) reduces the tensile strength of cured films directly deposited therefrom.

In carrying out the present invention, there is added to the "cold GR–S" latex an amount of polyvinyl chloride latex to give 5 to 35 parts of polyvinyl chloride per 100 parts of solids of the GR–S latex. The GR–S latex may contain other compounding ingredients as in conventional compounding, and the desired articles may be made by direct deposition of solids from the latex, as in dipping, coating, foam sponge and other conventional latex manufactures. Polyvinyl chloride latex, as is well known, is made by emulsion polymerization of liquefied monomeric vinyl chloride under pressure (see Mark et al. 2,068,424). The temperature of the vinyl chloride polymerization is not critical, and is preferably from about 40° C. to about 55° C. The polyvinyl chloride latices may be produced with the dispersed polyvinyl chloride having an average particle diameter, based on the average area of the particles, of from about 100 Å (Angstrom units) to 4000 Å (i. e. about 0.01 to 0.4 micron) or greater by methods known in the art. For example, emulsion polymerization of monomeric vinyl chloride with all the emulsifying agent initially added will give latices of average particle diameter from about 100 Å to 300 Å depending on the polymerization recipe and the kind and amount of emulsifying agent. With low initial concentration of emulsifying agent and subsequent additions as polymerization progresses, as shown in U. S. Patent 2,579,908, latices of larger particle size may be produced. Also, seeding of the initial vinyl chloride monomer emulsion with a small amount of a previously formed polyvinyl chloride latex to produce polymerization of the monomer on the polymer particles, and if desired repeating the seeding technique in subsequent polymerizations, will give latices of large particle size as shown in British Patent 627,265. The polyvinyl chloride latex added to the "cold GR–S" latex according to the present invention should have an average particle diameter of about 100 Å to 2000 Å, and preferably of about 100 Å to 500 Å for the greatest increase in tensile strength of cured deposited films. Polyvinyl chloride latices of average particle diameter above 2000 Å do not give the large increases in tensile strength of deposited films that are obtained with the polyvinyl chloride latices of smaller particle size. The polyvinyl chloride particles reinforce the film deposited from the "cold GR–S" latex. The average particle diameter of the "cold GR–S" latex is not critical and the polyvinyl chloride particles from the polyvinyl chloride latex will reinforce the film deposited from a GR–S latex of any average particle diameter, from the conventional small particle size GR–S latex of about 300 Å to 500 Å average particle diameter to the larger particle size GR–S latices of up to 4000 Å average particle diameter, which may be made by the addition of small amounts of electrolytes to the polymerization recipe, and by the low initial soap process of U. S. Patent 2,579,908.

The following illustrates the present invention. All parts and percentages referred to herein are by weight.

A "cold GR–S" latex which was an emulsion polymerizate of a mixture of 70 parts of butadiene and 30 parts of styrene polymerized at 50° F. to a conversion of over 50% was compounded with 3 parts of potassium oleate, 1.5 parts of accelerator, 3 parts of zinc oxide, 2 parts of sulfur, 0.5 part of antioxidant and 0.4 part of ammonium alginate thickener, per 100 parts of synthetic rubber in the latex. The parts in the above recipe are parts dry weight, and the compounding ingredients were added as solutions or dispersions in water as in conventional compounding practice. To four portions of the latex were also added a polyvinyl chloride latex in amounts to give 11, 15, 23 and 34 parts of polyvinyl chloride per 100 parts of synthetic rubber. This and the other polyvinyl chloride latices referred to herein were polymerized at conventional polymerization temperature of about 50° C. to over 50% conversion of vinyl chloride to polyvinyl chloride. The polyvinyl chloride latex had an average particle diameter of 150 Å.

Films were made from the GR–S latex compounds containing the 0, 11, 15, 23 and 34 parts of polyvinyl chloride per 100 parts of synthetic rubber by building up layers of latex on an endless belt and passing them over a hot plate to dry the successive layers. Seven coats gave a film thickness of about 0.015 inch thickness, and this was stripped from the belt, cured for 30 minutes in hot air at 212° F., and tensile strength tests were made on the cured films.

The film from the GR–S latex compound with no added polyvinyl chloride gave a tensile strength of 1000 lbs. per square inch, whereas the films from the GR–S latex to which 11, 15, 23 and 34 parts of polyvinyl chloride per 100 parts of synthetic rubber solids had been added showed tensile strengths of 2500, 3450, 2700 and 2600 lbs. per sq. in. respectively.

Polyvinyl chloride latices with average particle diameters of 250 Å and 500 Å give about the same improvements in tensile strength of "cold GR–S" latex films as the above polyvinyl chloride latex of 150 Å average particle diameter.

Polyvinyl chloride latex of average particle diameter of 2000 Å gave somewhat less improvements in tensile strength of GR-S films than the above. Thus, with the same "cold GR-S" latex as above, amounts of a polyvinyl chloride latex having an average particle diameter of 2000 A added to the GR-S latex to give 5, 10, 15 and 20 parts of polyvinyl chloride per 100 parts of synthetic rubber, the tensile strengths of the films prepared and cured as above were 2000, 2060, 1870 and 2030 lbs. per sq. in., respectively.

Contrasted to the above significant improvements in the tensile strength of "cold GR-S" films by addition of polyvinyl chloride latex, the addition of the same polyvinyl chloride latices reduces the tensile strength of films laid down from "hot GR-S" latex and from natural Hevea latex. Thus, with a "hot GR-S" latex (polymerized at 120° F.) having cured film tensile strength of 560 lbs. per sq. inch without polyvinyl chloride addition, the addition of 5, 10, 15 and 20 parts (solids) of a polyvinyl chloride latex of 150 A average particle diameter per 100 parts of GR-S solids gave 460, 360, 320 and 430 lbs. per sq. in. tensile strength, respectively, and similar additions of a polyvinyl chloride latex of 2000 Å average particle diameter gave 440, 410, 500 and 410 lbs. per sq. in. tensile strengths respectively. In the case of a natural Hevea rubber latex having a cured film tensile strength of 5130 lbs. per sq. in. without polyvinyl chloride addition, the addition to the natural latex of 5, 10, 15 and 20 parts (solids) of a polyvinyl chloride latex of 150 Å average particle diameter per 100 parts of natural rubber solids gave 4950, 3700, 3560 and 2600 lbs. per sq. in. tensile strength, respectively, and similar additions of a polyvinyl chloride latex of 2000 Å average particle diameter gave 4620, 4240, 3710 and 3410 lbs. per sq. in. tensile strengths, respectively.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of making synthetic rubber articles which comprises mixing a synthetic rubber latex and a polyvinyl chloride latex, each latex being separately prepared, said synthetic rubber latex being an aqueous emulsion polymerizate of a mixture of about 70 to 80 parts of butadiene-1,3 and correspondingly about 30 to 20 parts of styrene polymerized at a temperature in the range of about 40° F. to about 55° F., and said polyvinyl chloride latex having an average particle diameter, based on the area of the particles, of about 100 to 2000 Angstrom units, said polyvinyl chloride latex being present in amount to give 5 to 35 parts of polyvinyl chloride per 100 parts of solids of the synthetic rubber latex, and depositing the solids of the mixture of such latices in the shape of the desired article.

2. The method of making synthetic rubber articles which comprises mixing a synthetic rubber latex and a polyvinyl chloride latex, each latex being separately prepared, said synthetic rubber latex being an aqueous emulsion polymerizate of a mixture of about 70 to 80 parts of butadiene-1,3 and correspondingly about 30 to 20 parts of styrene polymerized at a tempearture in the range of about 40° F. to about 55° F., and said polyvinyl chloride latex having an average particle diameter, based on the area of the particles, of about 100 to 500 Angstrom units, said polyvinyl chloride latex being present in amount to give 5 to 35 parts of polyvinyl chloride per 100 parts of solids of the synthetic rubber latex, and depositing the solids of the mixture of such latices in the shape of the desired article.

References Cited in the file of this patent

UNITED STATES PATENTS 2,614,089      Harrison et al.      Oct. 14, 1952